3,533,992
CONJUGATED DIOLEFIN POLYMER RUBBER
CONTAINING SUBSTITUTED DIPHENYLA-
MINES AS ANTIOXIDANT
Norman K. Sundholm, Middlebury, Conn., assignor to
Uniroyal, Inc., a corporation of New Jersey
No Drawing. Original application Apr. 7, 1966, Ser. No.
540,830, now Patent No. 3,452,056, dated June 24,
1969. Divided and this application Dec. 13, 1968, Ser.
No. 783,735
Int. Cl. C08f 45/60
U.S. Cl. 260—45.9
6 Claims

ABSTRACT OF THE DISCLOSURE

The new chemicals 4,4'-bis(alpha, alpha-dimethylbenzyl) diphenylamine and 4,4'-bis(alpha-methylbenzhydryl)diphenylamine are antioxidants for highly unsaturated rubbers, as are related substituted diphenylamines and phenylnaphthylamines of the formulas

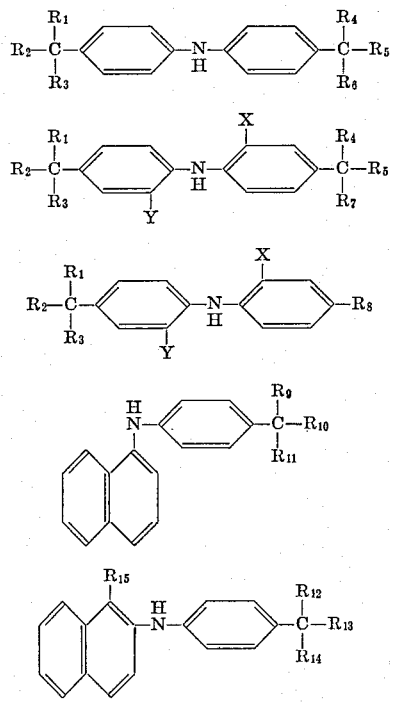

wherein $R_1$, $R_9$ and $R_{12}$ are phenyl or p-tolyl, and the remaining R's, X and Y may be alkyl or various other substituents.

This application is a division of my copending application Ser. No. 540,830, filed Apr. 7, 1966, now U.S. Pat. 3,452,056, issued June 24, 1969. Said patent claims, as new chemicals, certain of the antioxidant substances disclosed herein. Substances disclosed herein as antioxidants for highly unsaturated rubbers are disclosed and claimed as antioxidants for other substrates in copending application Ser. No. 540,817 of Edward L. Wheeler, filed Apr. 7, 1966, now U.S. Pat. 3,505,225, issued Apr. 7, 1970; certain of the substances are claimed as new chemicals in a division of said Ser. No. 540,817, namely, application Ser. No. 787,577, filed Dec. 27, 1968.

This invention relates to new chemicals which are derivatives of diphenylamine and have the formula:

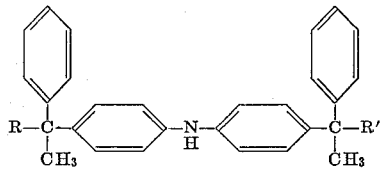

where R and R' are methyl or phenyl.

The chemical wherein R and R' are methyl is 4,4'-bis (alpha, alpha-dimethylbenzyl) diphenylamine and the chemical in which R and R' are phenyl is 4,4'-bis(alpha-methylbenzhydryl) diphenylamine.

The chemicals are useful as antioxidants in natural rubber, and, as is disclosed and claimed in copending application Ser. No. 540,817 of Edward L. Wheeler filed Apr. 7, 1966, they are especially useful either alone, or in combination with each other, or in combination with dialkyl 3,3'-thiodipropionates (e.g. dilauryl 3,3'-thiodipropionate), for the protection of organic materials having relatively low olefinic unsaturation, which are subject to oxidative deterioration particularly at elevated temperatures. Examples of materials which are subject to oxidative deterioration at elevated temperatures either in the course of their processing or fulfilling their prescribed function include materials of low unsaturation or essentially saturated materials, whether resins or rubbers, such as the alpha-olefin polymers. The alpha-olefin polymers include resinous homopolymers of alpha-olefins (e.g., polyethylene, polypropylene) or the rubbery copolymers of two or more different alpha-olefins (e.g., ethylene-propylene rubber, known as "EPM"). Also included are resinous or rubbery polymers having a minor amount of unsaturaiton, such as the alpha-olefin polymers which are rubbery terpolymers of two or more different alpha-olefins with at least one nonconjugated diolefin (e.g., rubbery terpolymers of ethylene, propylene and dicyclopentadiene, 1,4-hexadiene, methylene norbornene, cyclooctadiene, or the like, known as "EPDM"); these ordinarily contain less than 25% of olefinic unsaturation (i.e., less than 25% by weight of the diolefin). Similarly, the acrylonitrile-butadiene-styrene polymers (called "ABS" thermoplastics) may be employed. These are usually either (1) graft copolymers of styrene and acrylonitrile on a polybutadiene rubber spine or on a butadiene-styrene rubber spine (with or without additional separately prepared styrene-acrylonitrile resin), or (2) physical mixtures of styrene-acrylonitrile resin with butadiene acrylonitrile rubber. The olefinic unsaturation (i.e., butadiene content) of such ABS compositions is frequently less than 40%. Other polymers to which the chemicals of the invention may be added include polyamides (nylon), polyesters (e.g. polyethylene terephthalate or copolymers thereof, notably in the form of fibers or films), acetal resins (polymers or copolymers as described for example in Modern Plastics Encyclopedia, 1966, pages 109–113; see also U.S. Pat. 3,027,352). The present chemicals are useful also as antioxidants for lubricants, whether essentially natural lubricating oil obtained from petroleum, or synthetic lubricants of the kind represented by such ester lubricants as alkyl esters of dicarboxylic acids [for example, those in which the alkyl group has 6–18 carbon atoms and the dicarboxylic acid has 6–18 carbon atoms, as in di(2-ethylhexyl)sebacate] or fatty acid (e.g. $C_8$–$C_{14}$ acids) esters of polyols such as neopentylglycol, trimethylol propane, pentaerythritol or the like (see "Synthetic Lubricants" by Gunderson et al., Reinhold, 1962). Thus, from 0.01% to 4% by weight of the present chemicals may be added to the substrates mentioned to protect them against oxidation. In many cases synergistic protection is afforded by further including from 4% to 0.01% of a dialkyl (e.g. alkyl of 8 to 20 carbon atoms) 3,3'-thiodipropionate such as dilauryl 3,3'-thiodipropionate.

It has previously been known to employ 4,4'-bis(1,1,3,3-tetramethylbutyl) diphenylamine as an antioxidant for rubber.

U.S. Pat. 2,943,112, Popoff et al., describes the use of alpha-methylstyrene to reduce the amount of unreacted diphenylamine or monoalkylated diphenylamine present after alkylating the diphenylamine with a $C_5$–$C_{12}$ olefin.

The synthesis of 4-trityldiphenylamine and 4,4'-ditrityldiphenylamine has been reported by D. Craig, J. Am. Chem. Soc. 71, 2250 (1949); G. Baum et al., J. Org. Chem. 29, 1264 (1964) and the use of same as a rubber antioxidant in U.S. Pat. 1,902,115 (Mar. 21, 1933) and U.S. Pat. 1,950,079 (Mar. 6, 1934) although the described structure was incorrect.

The present derivatives of diphenylamine are more effective than the parent compound or the known 4,4'-dialkyldiphenylamines either alone, in combinations, or in combination with the dialkyl 3,3'-thiodipropionate. The present derivatives are less discoloring than those of the prior art and surprisingly in the presence of dialkyl 3,3'-thiodipropionates show no discoloration after thermal aging.

The compounds of the invention may be prepared by alkylating diphenylamine with the appropriate olefin using a suitable acid catalyst such as aluminum chloride, zinc chloride, or acid clay.

The following examples will serve to illustrate the practice of the invention in more detail.

EXAMPLE 1

The preparation of 4,4'-bis(alpha,alpha-dimethylbenzyl) diphenylamine.

A mixture of 84.5 g. of diphenylamine, 13 g. of montmorillonite clay (Girdler Catalysts' designation KSF/O), and 100 ml. of benzene was heated to the reflux temperature with stirring. Water was removed to allow the pot temperature to reach 130° C. 124 g. of alpha-methyl styrene was added dropwise during 20 minutes and the mixture was stirred for 4 hours at 130–135° C. The catalyst was removed by filtration, and the filtrate was crystallized by pouring into hexane. 152 g. (75% yield) of product was obtained M.P. 99–100° C. The product was recrystallized twice from hexane, M.P. 101–102° C.

*Analysis.*—Calculated for $C_{30}H_{31}N$ (percent): C, 88.9; H, 7.65; N, 3.45. Found (percent): C, 88.8; H, 7.72; N, 3.34.

EXAMPLE 2

The preparation of 4,4'-bis(alpha-methylbenzhydryl) diphenylamine.

A mixture of 7.6 g. of diphenylamine, 4 g. of montmorillonite clay catalyst (Girdler Catalysts' designation KSF/O), and 150 ml. of toluene was heated to the reflux temperature with stirring. Water was removed by azeotropic distillation and toluene was further removed until the pot temperature reaches 130° C. 24.5 g. of 1,1-diphenylethylene was added dropwise during 15 minutes and the reaction mixture was stirred for 5 hours at 135° C. The catalyst was removed by filtration and the product was crystallized from hexane to obtain 21 g. (88%) M.P. 148–159° C. Two recrystallizations from isopropanol gave pure material M.P. 171.0–171.5° C.

*Analysis.*—Calculated for $C_{40}H_{35}N$ (percent): C, 90.7; H, 6.66; N, 2.65. Found (percent): C, 90.7; H, 7.07; N, 2.31.

EXAMPLE 3

This example illustrates the use of chemicals of the invention as antioxidants for natural rubber. A natural rubber composition was prepared in accordance with the following recipe:

Masterbatch No. 1

| | Parts by weight |
|---|---|
| Pale crepe | 98.65 |
| Zinc oxide | 10.00 |
| Lithopone | 60.00 |
| Whiting | 60.00 |
| Zinc laurate | 0.50 |
| Sulfur | 3.00 |
| Masterbatch #2 | 1.50 |
| | 233.65 |

Masterbatch No. 2

| | Parts by weight |
|---|---|
| Pale crepe | 90.0 |
| Tetramethylthiuram monosulfide | 10.0 |
| | 100.0 |

One part by weight of the antioxidants of the invention listed in the table below was then milled into 233.65 parts of masterbatch #1 and samples were cured at 274° F. for 30 minutes. Dumbbell-shaped test specimens were prepared according to ASTM Method D 412. They were aged along with specimens containing no added antioxidant in an oxygen bomb at 300 p.s.i. for 96 hours at 70° C. In another test specimens with and without antioxidant in an oxygen bomb at 300 p.s.i. for 96 hours at 70° tensile strength of the aged and unaged specimens were determined. The greater percent retention of tensile strength of the specimens containing the compounds of this invention over those containing no antioxidant demonstrates their antioxidant activity. The data are given in the following table:

| Compound | Percent tensile retained | |
|---|---|---|
| | Oxygen bomb | Oven |
| None | 7, 19 | 35, 47 |
| 4,4'-bis(alpha-alphadimethylbenzyl)-diphenylamine | 71 | 60 |
| 4,4'-bis(alpha-methylbenzhydryl)-diphenylamine | 64 | 62 |

Reference may be had to the above-mentioned application Ser. No. 540,817 for further examples of use of the chemicals of the invention as antioxidants.

In one aspect the invention is directed to the use of the novel chemicals disclosed herein, or the novel chemicals of said application Ser. No. 540,817 (the disclosure of which is hereby incorporated herein by reference) as antioxidants or stabilizers for highly unsaturated polymers, especially rubbery polymers, notably the rubbers containing a major proportion of a diene. Among these may be mentioned by way of non-limiting example the conjugated diolefin polymers, whether homopolymers such as cis-polyisoprene (natural or synthetic) or polybutadiene (solution prepared or emusion prepared), or copolymers containing at least 50% by weight of a conjugated diolefin copolymerized with at least one copolymerizable monoethylenically unsaturated monomer, such as styrene, acrylonitrile, vinyl-pyridine, alkyl acrylates, and the like, acrylic acid and the like, etc. One of the most important of such copolymers is SBR (emulsion prepared or solution prepared). The chemicals may be added to a latex of such polymer, or to a solution of the polymer, or to the solid polymer.

Having thus described my invention, what I claim and desire to protect by Letters Patent is:

1. A composition comprising a polymer consisting of a conjugated diolefin homopolymer rubber, and, in intimate admixture with said polymer, as an antioxidant, from 0.01 to 4% by weight of a chemical of the formula

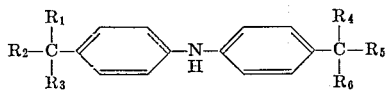

where $R_1$ is a phenyl or p-tolyl radical, $R_2$ and $R_3$ are selected from methyl, phenyl and p-tolyl radicals, $R_4$ is selected from methyl, phenyl, p-tolyl and neopentyl radicals, $R_5$ is selected from methyl, phenyl, p-tolyl and 2-phenylisobutyl radicals, and $R_6$ is a methyl radical.

2. Composition as in claim 1 in which the chemical is 4,4'-bis(alpha, alpha-dimethylbenzyl) diphenylamine.

3. Composition as in claim 1 in which the chemical is 4,4'-bis(alpha-methylbenzhydryl)diphenylamine.

4. A composition as in claim 1, in which the said polymer is natural rubber and the said chemical has the formula:

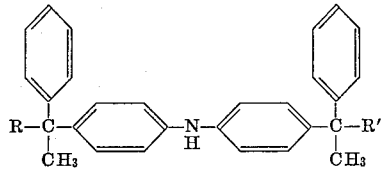

wherein R and R' are methyl or phenyl.

5. A composition as in claim 4 in which the said chemical is 4,4' - bis(alpha,alpha - dimethylbenzyl)diphenyl amine.

6. A composition as in claim 4 in which the said chemical is 4,4'-bis(alpha-methylbenzhydryl)diphenylamine.

References Cited

UNITED STATES PATENTS 2,530,769  11/1950  Hollis _____ 260—45.9

FOREIGN PATENTS 735,489  8/1955  Great Britain.
410,274  1/1933  Great Britain.

HOSEA E. TAYLOR, Jr., Primary Examiner

U.S. Cl. X.R.

260—23.7, 29.7, 41.5, 45.85, 807, 809, 814, 815